Patented Apr. 13, 1954

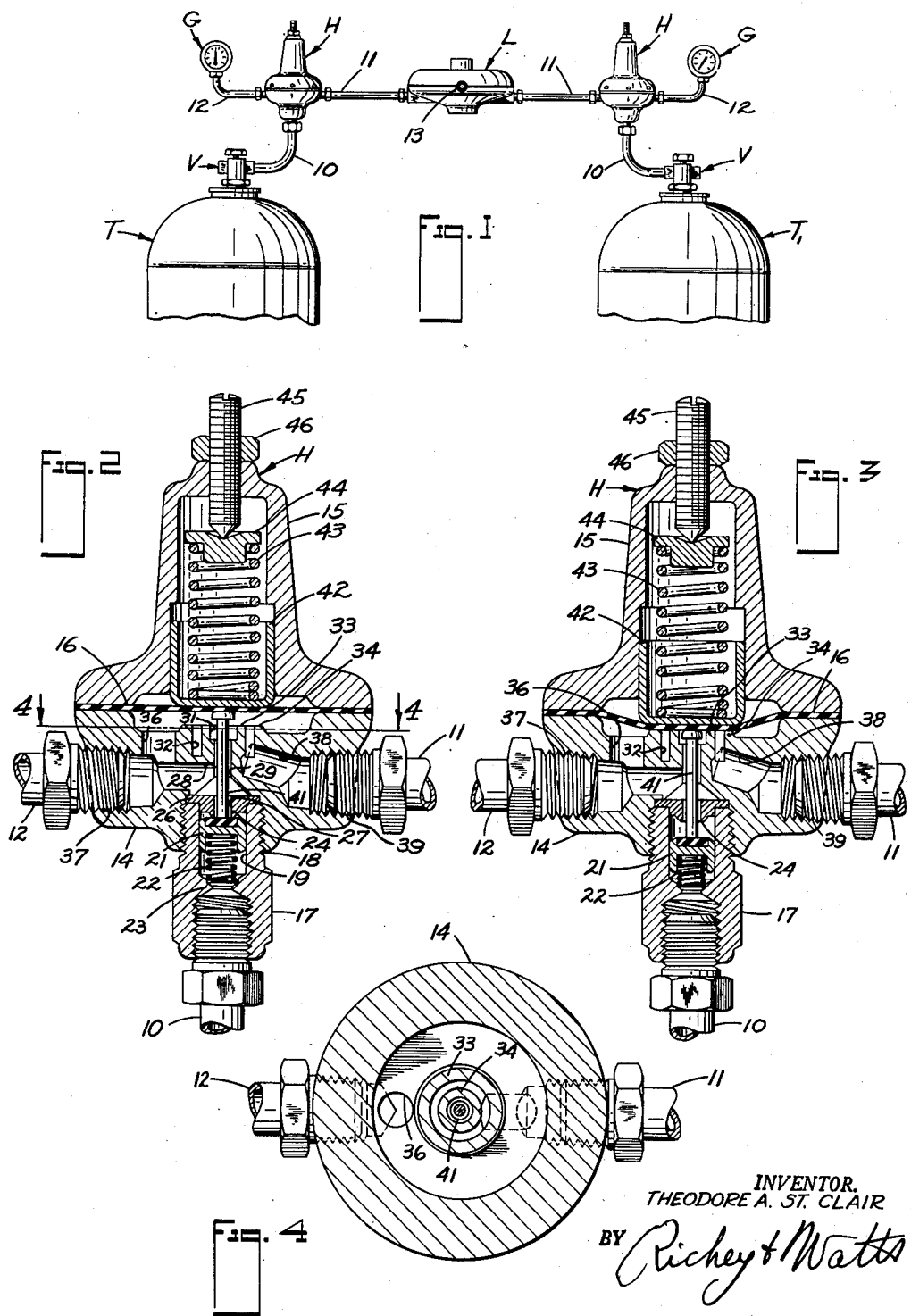

2,674,829

UNITED STATES PATENT OFFICE 2,674,829

PRESSURE REGULATOR

Theodore A. St. Clair, Cleveland, Ohio, assignor to The Weatherhead Company, Cleveland, Ohio, a corporation of Ohio Application April 12, 1951, Serial No. 220,637

4 Claims. (Cl. 50—4)

This invention relates to a combination pressure regulator and reverse flow check valve.

An example of one application of the invention will be given with reference to the distribution of liquefied petroleum gases. Such systems commonly employ a service tank containing liquefied petroleum gas at about 125 p. s. i. and which is connected to a high pressure regulator which reduces the tank pressure to an intermediate pressure in the neighborhood of 15 p. s. i. The high pressure regulator is in turn connected to a low pressure regulator that reduces the gas pressure almost at atmosphere for connection to various service appliances.

The low pressure regulator is often of the automatic throw-over type which means that it is also connected to a second or reserve tank. When the primary tank is depleted, the low pressure regulator switches to the reserve tank so that the primary tank may be removed for refill. Of course, it is eventually necessary to remove the reserve tank for refill. In either case, it has been found desirable to incorporate a reverse flow check valve in the system to insure that no reverse flow or leakage from one tank will occur if the other of the tanks is disconnected.

The principal object of the invention is to incorporate the reverse flow check valve in the high pressure regulator in such a manner as to improve the sealing action of the diaphragm, when the latter is acting as a check valve, to prolong the life of the diaphragm and to simplify and render more economical the machining and construction of the combined check valve and regulator.

Briefly, these objects are accomplished by providing a spring-closed regulating valve that is pin actuated by the diaphragm, there being a pair of annular lands surrounding the pin and formed by machining a groove in a wall of the casing. This provides a relatively large seating area for the diaphragm which is centered therewith and does not tend to provide a localized or concentrated force that will eventually destroy the diaphragm when acting as a check. This construction likewise lends itself to rapid and inexpensive machining operation performable on automatic machines from an open face of the casing or body part of the regulator. This construction also assures dependable and simple seating when the device is acting as a check valve. The manner in which these and other objects of the invention may be accomplished will be apparent in the following detailed description of the preferred form of the invention.

In the drawings:

Fig. 1 is a view of a typical installation;

Fig. 2 is a section through the regulator in its normal operating position;

Fig. 3 shows the regulator acting as a check valve;

Fig. 4 is a section taken on 4—4 of Fig. 2.

The installation shown in Fig. 1 which represents a typical application of the invention embodies a primary tank T, a cylinder valve V, a line 10 leading from the valve to the high pressure regulator H, a line 11 leading from the high pressure regulator to the low pressure changeover regulator L, and a line 12 leading to a pressure gauge G. A service line 13 leads from the low pressure regulator to the service appliances. The reserve tank $T_1$ incorporates the same connections and fittings to which the same reference characters have been applied.

It can be seen in Fig. 1 that if either of the tanks be removed and if the low pressure regulator (which may be of either the manual or automatic changeover type) fails to function properly, gas from the connected tank might escape through line 10 of the disconnected tank. To prevent this regulator H is formed to incorporate the reverse flow check valve.

Referring to the remaining figures, the high pressure regulator H has a casing including a lower part 14 and an upper part 15 clamped together against the diaphragm 16. The diaphragm 16 defines with a lower casing part 14 a fluid regulating chamber. There is an inlet nipple 17 threaded into the lower casing part as at 18 and formed with an inlet bore 19 for reception of the main or regulating valve 21. This valve is urged towards its closed position by means of a spring 22 backed up by a flange 23 formed in the bore 19. A valve seat 24 is provided by machining a separate washer 26 clamped into place by nipple 17 and apertured as at 27 to provide a fluid passage. The lower casing part is formed with a generally transverse wall 28 having a central axial bore 29 extending therethrough.

There is a concentric counterbore 31 and a concentric groove 32 machined in the outer face of the wall to form concentric annular lands 33 and 34 which act as valve seats for the diaphragm when the device serves as a check valve. The wall is apertured as at 36 to one side of the valve seats to place the diaphragm in communication with the inlet. A port 37 communicates with the regulating chamber in order that the gauge G may be connected to indicate tank pressure. A bore 38 is formed in the wall to intersect the groove 32 and has an extension bore in the form of a threaded passage 39 which serves as the outlet connection which, by means of a suitable fitting, communicates with line 11 leading to the low pressure regulator and eventually to the service connections.

In order to make the regulating valve 21 responsive to the position of the diaphragm 16, a pin 41 is disposed between the diaphragm and the valve so that motion of the diaphragm towards the valve opens the latter and establishes communication with the outlet port. The upper casing part 15 is fitted with a sliding cup 42 which engages the diaphragm and receives a main or regulating spring 43 that is seated at its outer end on a washer 44. The force of the regulating spring and hence the outlet pressure may be adjusted by means of a set screw 45 threaded into the upper casing part and locked in place by lock nut 46.

In the installation described, full tank pressure may be in the nature of 125 p. s. i. and the spring force will be adjusted by means of screw 46 so that the diaphragm clears pin 41 and inlet valve 21 closes when the outlet pressure exceeds the pressure in the neighborhood of 15 p. s. i. Thus, any increase in outlet pressure above the selected or regulated value will lift the diaphragm clear of pin 41 permitting spring 22 to close the inlet valve.

So long as the tank is connected to the valve, the outlet pressure will fluctuate about the predetermined regulated value. Should the tank be disconnected, atmospheric pressure prevails in the regulating chamber and since valve spring 22 exerts a small force as compared to that of the regulating spring 43, the latter spring will control and urge the diaphragm against the concentric lands or seats 33 and 34. This isolates the outlet port 39 from the inlet port. The ports are so proportioned that the area represented by the confines of the lands 33 and 34 multiplied by the maximum pressure expected in the outlet line 11 is not enough to overcome the spring 43 to unseat the diaphragm. These ports may be so proportioned as to enable the regulator H to resist re-opening when its tank is disconnected under the influence of either the regulated pressure or the full tank pressure from the other tank. It will be obvious to those skilled in the art that the dimensions of the valve seats and diaphragm, and the strength of the regulating spring can be selected so that once the diaphragm is seated against lands 33 and 34, a pressure in groove 32 will be resisted by the spring whereas the same pressure applied to the inlet port when a new tank is fitted will lift the diaphragm.

Having completed a description of the preferred embodiment of the invention, it can be seen that the lower casing part 14 is readily machined from its upper and lower faces. The grooves or counterbores 31 and 32 are readily provided to thereby produce the check valve seat. The check valve seat is centered relative to the main spring 43 so that there is no tendency for unequal seating or canting and the seating areas are great enough to prevent undue distortion or deformation of the diaphragm material. This in combination with the concentricity of the seat and the absence of need for an off-center stop or the like plus the ease of machining and fabrication render the unit long lasting, positive and dependable in its action, and economical to produce.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A fluid pressure regulator comprising a casing, a diaphragm in said casing, said diaphragm mounted along its periphery in sealing engagement with said casing thereby defining with a portion thereof a regulating chamber, a fluid inlet port in the bottom of said casing, a valve seat in said port facing away from said casing, a regulating valve for said seat, a valve closure spring in said inlet urging said valve against said seat, a wall in said casing between said inlet port and said diaphragm, a first bore in said wall aligned with said valve, a pin extending through said bore and between said diaphragm and valve, a second bore in said wall to one side of said pin for establishing communication between said inlet port and said diaphragm, an annular groove in said wall surrounding said first bore and opening toward said diaphragm to form inner and outer continuous annular lands inwardly spaced from said sealing engagement between said diaphragm and said casing for sealing with said diaphragm, an outlet port communicating with said groove, and a regulating spring in said casing urging said diaphragm toward said wall and lands, said regulating spring being stronger than said valve closure spring.

2. A fluid pressure regulator comprising a casing, a diaphragm in said casing, said diaphragm mounted along its periphery in sealing engagement with said casing thereby defining with a portion thereof a regulating chamber, a fluid inlet port for said chamber, a regulating valve for said inlet port, a wall in said casing between said inlet port and said diaphragm, a bore through said wall, valve opening means extending through said bore and between said diaphragm and said valve, a port in said wall for establishing communication between said inlet port and said diaphragm, an annular groove in said wall surrounding said through bore coaxial therewith and opening toward said diaphragm to form inner and outer continuous annular lands inwardly spaced from said sealing engagement between said diaphragm and said casing for sealing with said diaphragm, an outlet port communicating with said groove, and a regulating spring in said casing urging said diaphragm toward said wall and lands.

3. A fluid pressure regulator comprising a casing, a diaphragm in said casing, said diaphragm mounted along its periphery in sealing engagement with said casing thereby defining with a portion thereof a regulating chamber, a fluid inlet port in the bottom of said casing, a valve seat in said port facing away from said casing, a regulating valve for said seat, a valve closure spring in said inlet urging said valve against said seat, a wall in said casing between said inlet port and said diaphragm, a bore in said wall aligned with said valve, a pin extending through said bore and between said diaphragm and valve, a through bore in said wall to one side of said pin for establishing communication between said inlet port and said diaphragm, a counterbore surrounding said through bore, an annular groove in said wall surrounding said bore coaxial therewith and opening toward said diaphragm to form inner and outer continuous annular lands inwardly spaced from said sealing engagement between said diaphragm and said casing for sealing with said diaphragm, an outlet port communicating with said groove, and a regulating spring in said casing urging said diaphragm toward said wall and lands, said regulating spring being stronger than said valve closure spring.

4. A fluid pressure regulator comprising a casing, a diaphragm in said casing, said diaphragm mounted along its periphery in sealing engagement with said casing thereby defining with a portion thereof a regulating chamber, a fluid inlet port in the bottom of said casing, a valve seat in said port facing away from said casing, a regulating valve for said seat, a valve closure spring in said inlet urging said valve against said seat, a wall in said casing between said inlet port and said diaphragm, a first bore in said wall aligned with said valve, a pin extending through said bore and between said diaphragm and valve, a second bore in said wall to one side of said pin for establishing communication between said inlet port and said diaphragm, an annular groove in said wall surrounding said first bore inwardly spaced from said second bore and opening toward said diaphragm to form inner and outer continuous annular lands for sealing with said diaphragm, an outlet port communicating with said groove, and a regulating spring in said casing urging said diaphragm toward said wall and lands, said regulating spring being stronger than said valve closure spring.

References Cited in the file of this patent

UNITED STATES PATENTS

| Number | Name | Date |
|---|---|---|
| 1,786,844 | Hesselman | Dec. 30, 1930 |
| 2,271,278 | St. Clair | Jan. 27, 1942 |
| 2,391,043 | St. Clair | Dec. 18, 1945 |

FOREIGN PATENTS

| Number | Country | Date |
|---|---|---|
| 622,332 | Germany | of 1933 |